US010915996B2

(12) United States Patent
Lin et al.

(10) Patent No.: US 10,915,996 B2
(45) Date of Patent: Feb. 9, 2021

(54) ENHANCEMENT OF EDGES IN IMAGES USING DEPTH INFORMATION

(71) Applicant: INTEL CORPORATION, Santa Clara, CA (US)

(72) Inventors: Yunbiao Lin, Shanghai (CN); Yadong Li, Portland, OR (US); Changliang Wang, Bellevue, WA (US); Gang Hu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 16/306,315

(22) PCT Filed: Jul. 1, 2016

(86) PCT No.: PCT/CN2016/088161
§ 371 (c)(1),
(2) Date: Nov. 30, 2018

(87) PCT Pub. No.: WO2018/000427
PCT Pub. Date: Jan. 4, 2018

(65) Prior Publication Data
US 2019/0147570 A1    May 16, 2019

(51) Int. Cl.
*G06T 5/00*   (2006.01)
*G06T 5/50*   (2006.01)
*G06T 5/20*   (2006.01)

(52) U.S. Cl.
CPC .............. *G06T 5/004* (2013.01); *G06T 5/003* (2013.01); *G06T 5/20* (2013.01); *G06T 5/50* (2013.01);
(Continued)

(58) Field of Classification Search
CPC ........... G06T 5/004; G06T 5/003; G06T 5/20; G06T 5/50
See application file for complete search history.

(56) References Cited

U.S. PATENT DOCUMENTS 9,083,959 B2 * 7/2015 Ha ............................. G06T 3/40
10,051,259 B2 * 8/2018 Ha ........................... G06T 7/529
(Continued)

FOREIGN PATENT DOCUMENTS

| CN | 102436306 | 5/2012 |
|----|-----------|--------|
| CN | 103163716 | 6/2013 |

(Continued)

OTHER PUBLICATIONS

De et al. "Image Sharpness Measure for Blurred Images in Frequency Domain" International Conference on Design and Manufacturing IConDM Procedia Engineering 64 (Aug. 30, 2013) pp. 149-158.*

(Continued)

*Primary Examiner* — Mia M Thomas
(74) *Attorney, Agent, or Firm* — Hanley, Flight and Zimmerman, LLC

(57) ABSTRACT

Techniques are provided for enhancement of edges in image frames using depth information. A methodology implementing the techniques according to an embodiment includes receiving a color image frame and a depth map frame. The method also includes generating a sharpness mask to control the application of image sharpening to the color pixels. The sharpness mask is based on the value of depth pixels corresponding to the color pixels; and on properties of the depth camera that generated the color image frame, including depth of field, focal distance, and hyperfocal distance. The method further includes calculating sharpness strength for the color pixels. The sharpness strength is proportional to the value of the depth pixel corresponding to the color pixel. The method further includes applying a sharpening filter to the color image frame to enhance edge image features. The sharpening filter is based on the sharpness mask and the sharpness strength.

20 Claims, 6 Drawing Sheets
(2 of 6 Drawing Sheet(s) Filed in Color)

(52) U.S. Cl.
CPC ............... *G06T 2200/04* (2013.01); *G06T 2207/10024* (2013.01); *G06T 2207/10028* (2013.01); *G06T 2207/20192* (2013.01)

(56) References Cited

U.S. PATENT DOCUMENTS

| | | | |
|---|---|---|---|
| 10,091,405 B2* | 10/2018 | Molina | H04N 5/265 |
| 2010/0284606 A1 | 11/2010 | Kao | |
| 2015/0022518 A1* | 1/2015 | Takeshita | H04N 13/261 |
| | | | 345/419 |
| 2015/0063692 A1* | 3/2015 | Zamfir | H04N 5/345 |
| | | | 382/165 |
| 2015/0093015 A1* | 4/2015 | Liang | G06K 9/6267 |
| | | | 382/154 |
| 2016/0005154 A1* | 1/2016 | Meyers | G06T 7/11 |
| | | | 382/274 |
| 2016/0048952 A1* | 2/2016 | Tezaur | G06T 5/004 |
| | | | 382/255 |
| 2017/0061586 A1* | 3/2017 | Uliyar | H04N 5/23229 |
| 2018/0027224 A1* | 1/2018 | Javidnia | H04N 13/271 |
| | | | 382/154 |
| 2018/0286066 A1* | 10/2018 | Peng | G06T 5/002 |
| 2019/0333237 A1* | 10/2019 | Javidnia | G06K 9/6215 |
| 2020/0193584 A1* | 6/2020 | Park | G06T 7/0002 |

FOREIGN PATENT DOCUMENTS

| | | |
|---|---|---|
| CN | 105245774 | 1/2016 |
| WO | 2018000427 | 1/2018 |

OTHER PUBLICATIONS

International Search Report International Patent Application No. PCT/CN2016/088161, dated Apr. 7, 2017, 5 pages.
Written Opinion of the International Searching Authority International Application No. PCT/CN2016/088161, dated Apr. 7, 2017, 5 pages.
International Preliminary Report on Patentability International Application No. PCT/CN2016/088161, dated Jan. 10, 2019, 7 pages.

* cited by examiner

No Sharpening Applied
210

— 202a

— 204a

Sharpening Applied (factor = 64)
220

202b —

204b —

US 10,915,996 B2

ENHANCEMENT OF EDGES IN IMAGES USING DEPTH INFORMATION

BACKGROUND

Mobile devices, such as smart phones and tablets have become a popular mechanism for image and video capture. The image quality delivered by the cameras in these devices is continually improving and has become a key product differentiator for consumers of these devices. As such, image signal processing (ISP) plays an increasingly important role in cameras and mobile platforms, and the ISP pipeline can be relatively complex. Edge enhancement is one of the operations that are typically performed in the ISP pipeline and generally involves the application of an image sharpening filter. Unfortunately, however, sharpening filters can also produce undesirable image artifacts in some regions of image frame.

BRIEF DESCRIPTION OF THE DRAWINGS

The patent or application file contains at least one drawing executed is color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Figure 1:
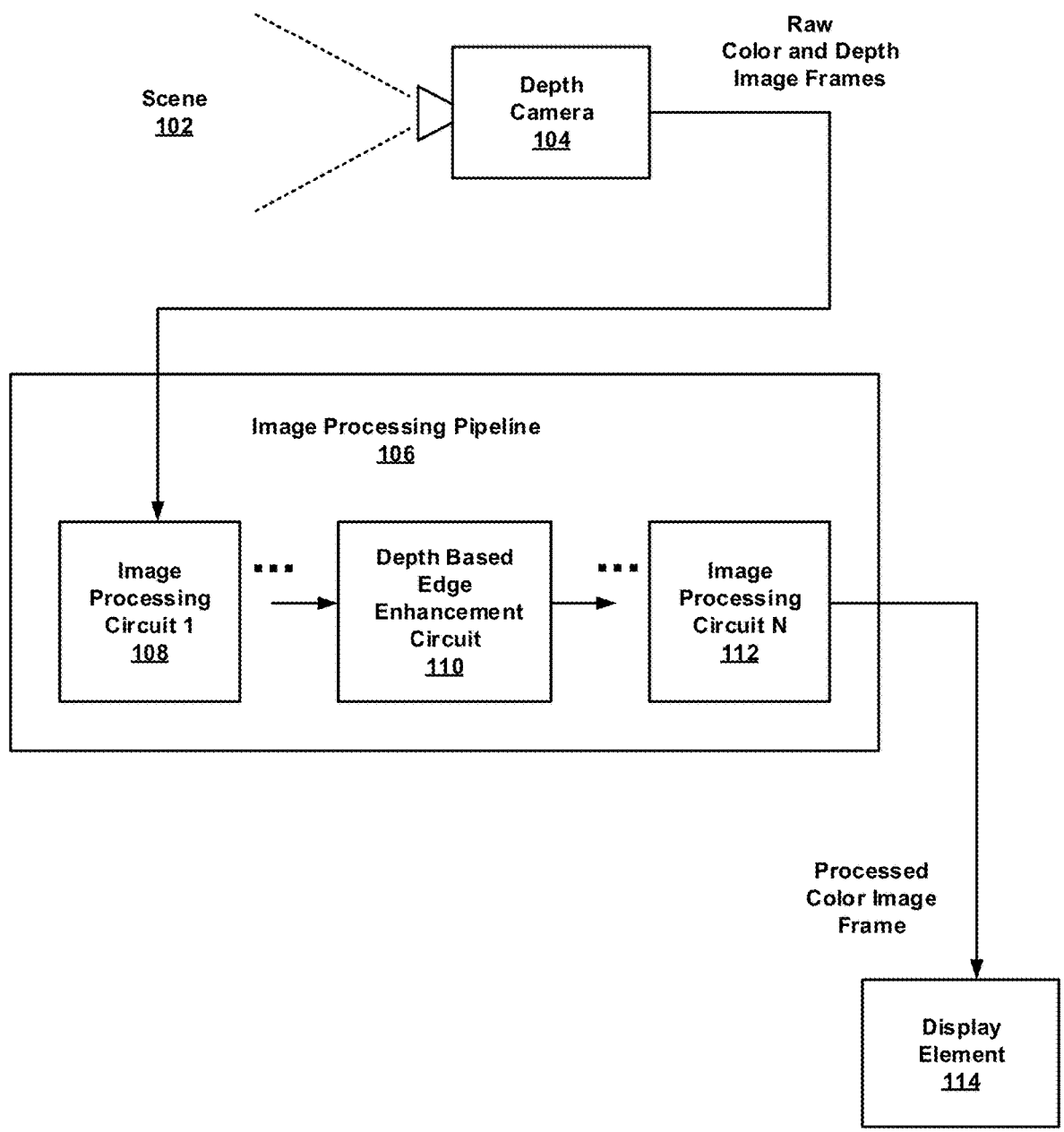
FIG. 1 is a top level block diagram of an implementation of a depth based edge enhancement system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for enhancement of edges in image frames using depth information. Such image frames may be generated, for example, by a depth camera or 3D camera or a multi-camera system from which both color pixels and depth pixels may be obtained. In some embodiments, the color pixels may represent red-green-blue (RGB) values. In some embodiments, the color pixels may represent luminance and chrominance values (referred to as YUV). The disclosed techniques can be used, for example, to improve the image quality by selectively applying a sharpening filter to regions of the image based on the distance from the camera of objects or scenery within those regions, Existing edge enhancement techniques typically apply the same sharpness strength to all pixels in an image frame, which can result in undesirable image artifacts in some regions of the image. The disclosed techniques employ spatial information provide by depth maps to calculate the distance relationship of objects and adjust the edge enhancement or sharpening strength based on the object depth, the focal distance and the depth of field. Larger sharpness factors or strengths are applied to more distant objects and the strengths can be dynamically adjusted based on the depth maps.

In accordance with an embodiment, the disclosed techniques can be implemented, for example, in a computing system or an image capture and processing system, or a software product executable or otherwise controllable by such systems. The system or product is configured to receive a color image frame and a depth map frame and to generate a sharpness mask to control the application of image sharpening to the color pixels of the color image frame. The sharpness mask is based on the value of depth pixels corresponding to the color pixels, and on properties of the depth camera that generated the color image frame, including depth of field, focal distance, and hyperfocal distance, as will be explained in greater detail below. Additionally, sharpness strengths are calculated for the color pixels. The sharpness strength is proportional to the value of the depth pixel corresponding to the color pixel. A sharpening filter is then applied to the color image frame to enhance edge image features. The sharpening filter is based on the sharpness mask and the sharpness strength.

The techniques described herein may allow for improved image, compared to existing methods that apply uniform sharpness filtering, according to an embodiment. Additionally, these techniques can be implemented on a broad range of computing and communication platforms, including mobile devices, as depth camera capabilities are becoming increasingly available on such platforms. These techniques may further be implemented in hardware or software or a combination thereof.

FIG. 1 is a top level block diagram 100 of an implementation of a depth based edge enhancement system, configured in accordance with certain embodiments of the present disclosure. A depth camera 104 is configured to generate one or more color and depth image frames of a scene 102. The scene may encompass any subject matter including people, objects of interest, and background regions, at varying distance from the camera. The image frames are provided to an image processing pipeline 106. The pipeline comprises a number of image processing circuits 108, 110, 112 which are configured to perform operations such as, fur example, noise reduction, sensor pattern demosaic, color enhancement, and edge enhancement, to name a few. Depth based edge enhancement circuit 110 is configured to selectively apply sharpness filtering to regions of the color image frame, based on depth information and camera parameters, to enhance the edges in the image, as will be described in greater detail below. The processed color image frame may then be displayed to the user on display element 114.

Figure 2:
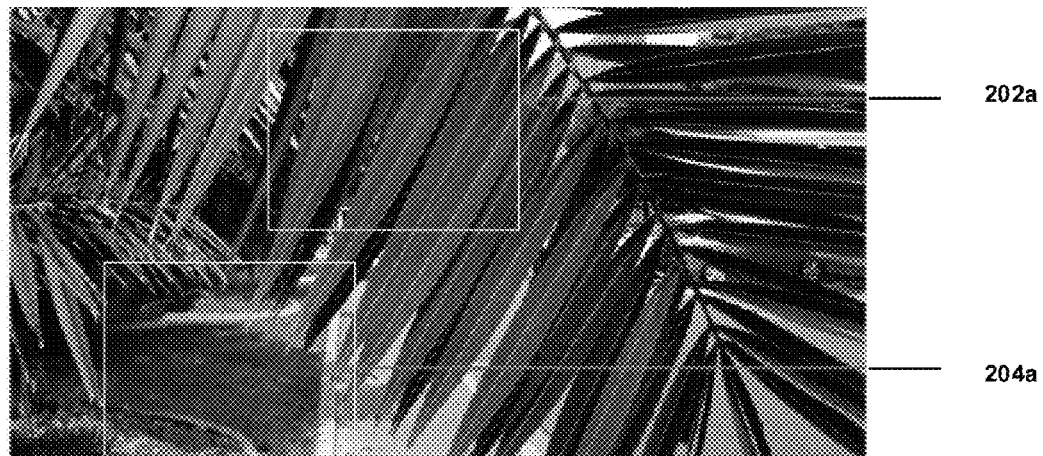
FIG. 2 illustrates examples of image sharpening for edge enhancement, in accordance with certain embodiments of the present disclosure.
Figure 2:

FIG. 2 illustrates examples of image sharpening for edge enhancement, in accordance with certain embodiments of the present disclosure. In the top image 210, no sharpening filter has been applied. Two regions of interest are noted: a foreground area of leaves 202a, and a background area of grass 204a. In the bottom image 220, a sharpening filter has been uniformly applied to the entire image frame, with a sharpening factor (or strength) of 64. As can be seen, the background area of grass 204b has been visually improved due to the fact that the edges of visual features have enhanced or sharpened. The leaves in the foreground region 202b, however, now exhibit undesirable artifacts and appear grainier and less natural.

Figure 3:
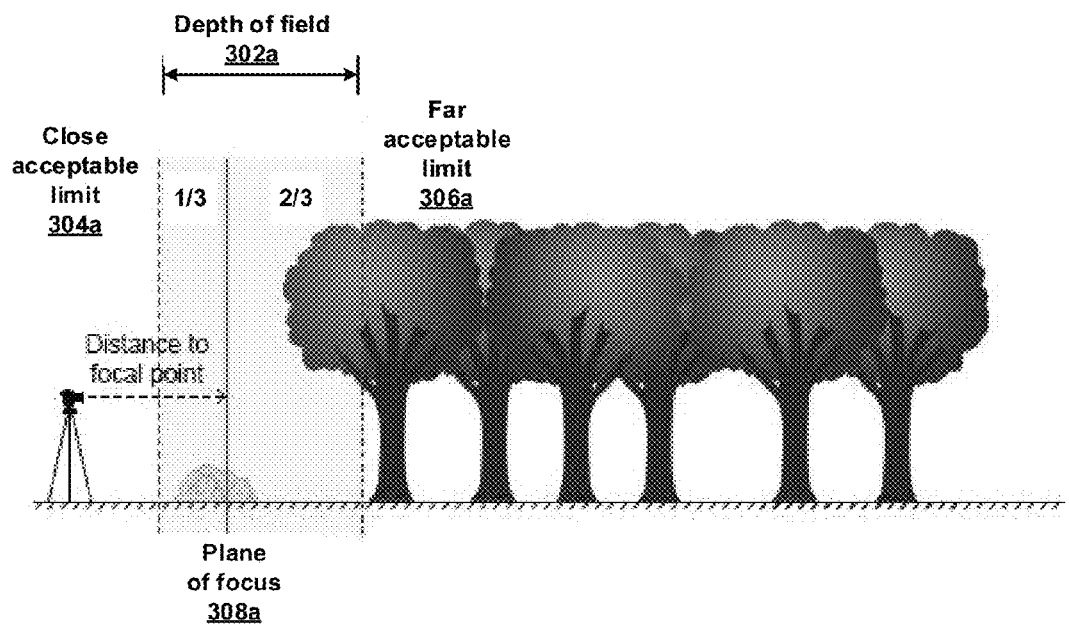
FIG. 3 illustrates focal distance and depth of field, in accordance with certain embodiments of the present disclosure.
Figure 3:
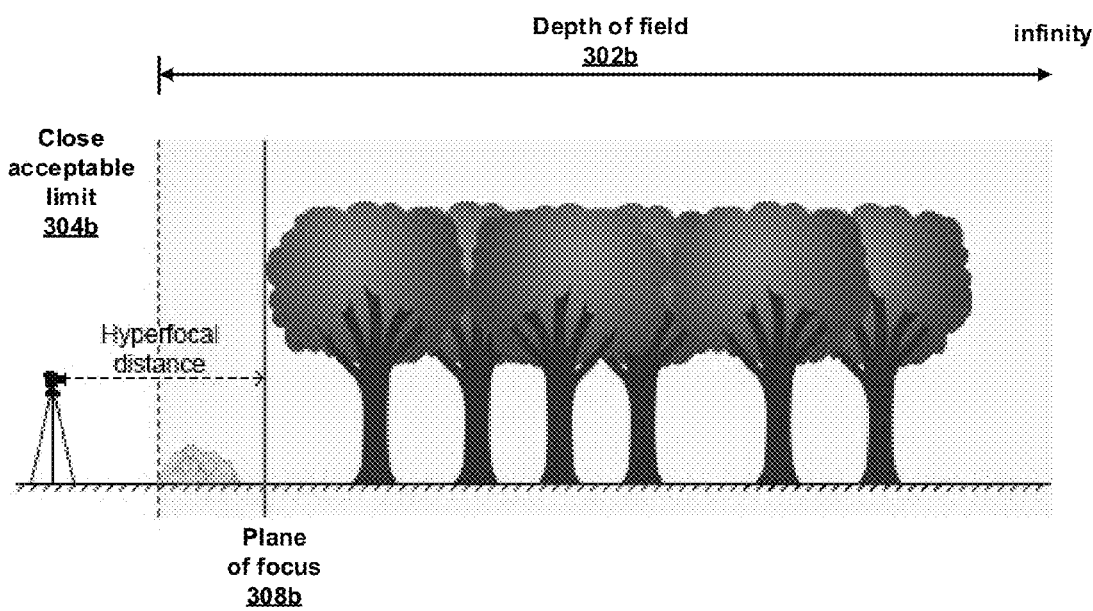

FIG. 3 illustrates focal distance and depth of field, in accordance with certain embodiments of the present disclosure. In the first example 300a, the camera is focused on an object (pile of leaves) in front of the trees. The plane of focus (or focal distance, f) 308a is therefore located at that object. A depth of field (DoF) 302a defines a range of distances about the focal plane 308a throughout which the image will be at an acceptable focus, and may vary as the focal distance changes. The depth of field 302a ranges from a close distance acceptable focus limit 304a to a far distance acceptable focus limit 306a. The close limit 304a typically lies about one third of the DoF from the focal plane toward the camera, while the far limit 306a typically lies about two thirds of the DoF from the focal plane away from the camera, as shown. The precise relationship between these limits 304a, 306 and the DoF 302a depends on characteristics of the camera lens and can be determined in advance from manufacturer specifications or calibration procedures, etc.

Another situation may arise, however, as illustrated in the second example 300b, where the camera is focused at a greater distance 308b, known as the hyperfocal distance, in this case at the leading edge of the trees. As the camera lens focuses to greater distances, the DoF generally increases and at some point the far acceptable limit reaches infinity.

Figure 4:
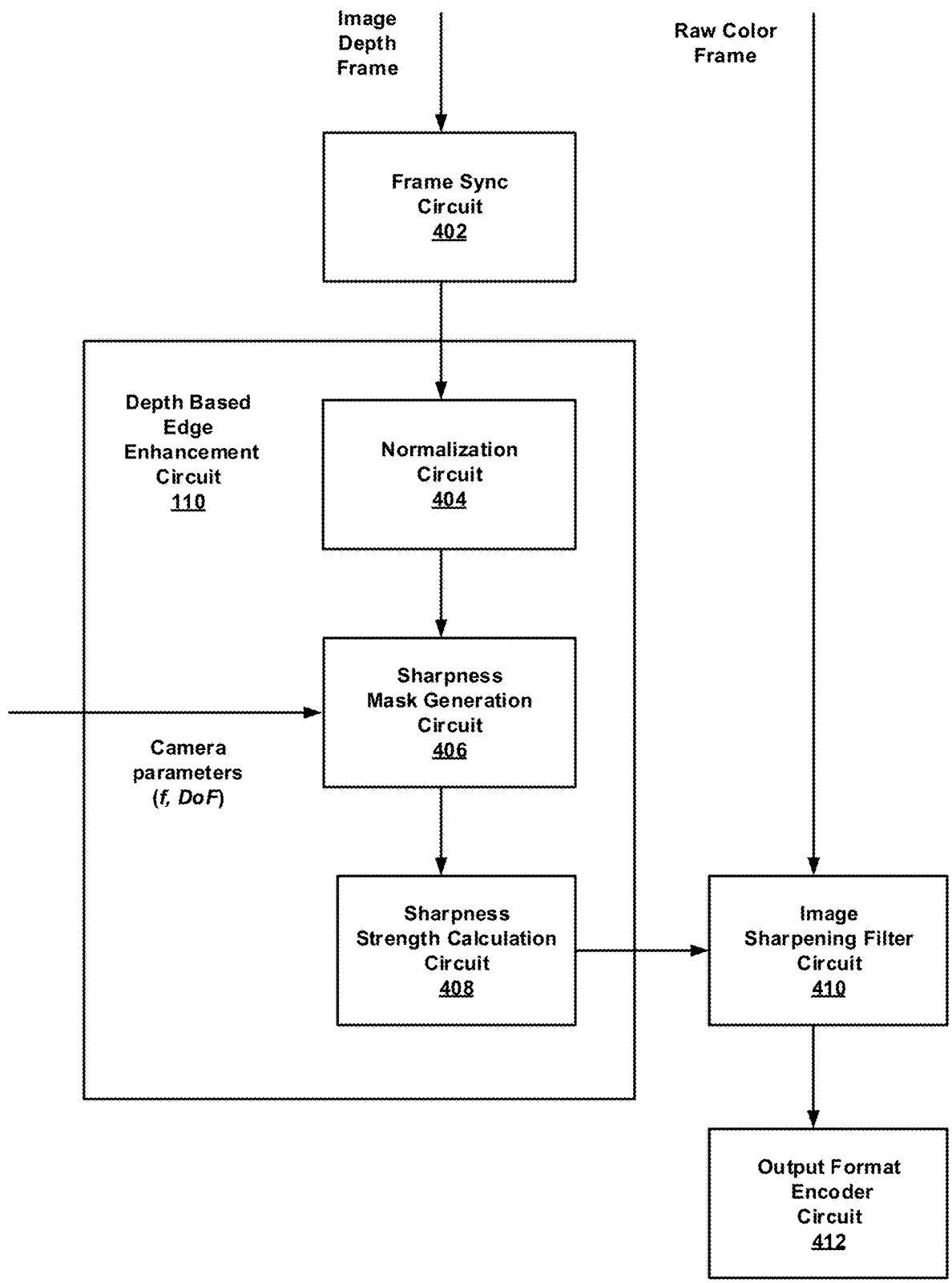
FIG. 4 is a more detailed block diagram of a depth based edge enhancement circuit, configured in accordance with certain embodiments of the present disclosure.

FIG. 4 is a more detailed block diagram of a depth based edge enhancement circuit 110, configured in accordance with certain embodiments of the present disclosure. The depth based edge enhancement circuit 110 is shown to include a normalization circuit 404, a sharpness mask generation circuit 406, and a sharpness strength calculation circuit 408. Additionally the depth based edge enhancement circuit 110 is shown to interface with a frame synchronization circuit 402, ark image sharpening filter circuit 410 and an output encoder format circuit 412. At a high level, the image processing pipeline can improve edge sharpness by using the depth map information to obtain the distance of objects or regions in the image. Sharpness strength can be reduced (or sharpness process can be eliminated) for objects that are within the depth of field region. Greater sharpness strength can be applied to objects that are outside the depth of field region. Once the sharpness strength is determined, any know: image sharpness technique may be used, in light of the present disclosure.

The normalization circuit 404 may be configured to normalize the depth map frame so that the values of the depth pixels are in the range of 0 to 255 or any other range suitable for subsequent calculations.

The sharpness mask generation circuit 406 may be configured to generate a sharpness mask to control application of image sharpening to each of the color pixels. The sharpness mask is based on a value of the depth pixel corresponding to each of the color pixels. The sharpness mask is farther based on a depth of field, a focal distance, and a hyperfocal distance of a camera (or camera lens) that generated the color image frame.

In some embodiments, the sharpness mask generation circuit is configured to set the sharpness mask to block the application of image sharpening to a color pixel if the value of the depth pixel is within a selected range about the focal distance f, where the range is based on the depth of field DoF. For example, sharp_mask($u,v$)=0, if (depth($u,v$)>$f$−DoF/3)

and if (depth(u,v)<f+DoF*⅔)
and if (f≠hyperfocal distance)
else−1 where u,v represent the coordinates of the color and associated depth pixel, and a mask value of 0 indicates blocking. The values ⅓ and ⅔ are used as examples and may vary in practice based on characteristics of the camera and lens.

The sharpness mask generation circuit may also be configured to set the sharpness mask to block the application of image sharpening if the value of the depth pixel is greater than half of the hyperfocal distance and the focal distance is greater than or equal to the hyperfocal distance. For example, sharp-mask($u,v$)=0, if (depth($u,v$)>hyperfocal/2)

and if (f=hyperfocal distance)

In some embodiments, the sharpness mask generation circuit may be configured to set the sharpness mask to block application of image sharpening to a color pixel if the value of the depth pixel is within one or more user selectable segments or ranges. For example, if the normalized depth pixel values range from 0 to 255, the user may select certain subsets within that range of depth values, for which sharpening will be performed.

The sharpness strength calculation circuit 408 may be configured to calculate sharpness strength for each of the color pixels. The sharpness strength is proportional to the value of the depth pixel corresponding to the color pixel. For example, sharp_strength($u,v$)=default_strength*sharp_mask($u,v$)*depth($u,v$)/norm where default_strength is a default sharpness strength that may be calculated by other known methods, in light of the present disclosure, and norm is the depth value normalization factor employed by normalization circuit 404 (e.g., 255).

The image sharpening filter circuit 410 may be configured to apply a sharpening filter to the color image frame to enhance edge image features. The sharpening filter is based on the sharpness mask and the sharpness strength.

The frame synchronization circuit 402 may be configured to synchronize the inputs from the color image sensor and the depth map sensor which may not necessarily be aligned. Synchronization of the color image frame and the depth map frame facilitates linking of the color pixels from the color image frame with their associated depth pixels from the depth map for the calculations described above.

The output encoder format circuit 412 may be configured to encode the processed and edge enhanced color image frame into a format suitable for preview, display, printing, storage or Further processing. In some embodiments, the encoded output format may be a JPEG (Joint Photographic Experts Group) format.

In some embodiments, the ISP circuitry may be configured to disable depth map based edge enhancement for example at a user's request or based on a configuration setting in such case, traditional sharpening techniques may be employed or sharpening may be disabled entirely.

Methodology

Figure 5:
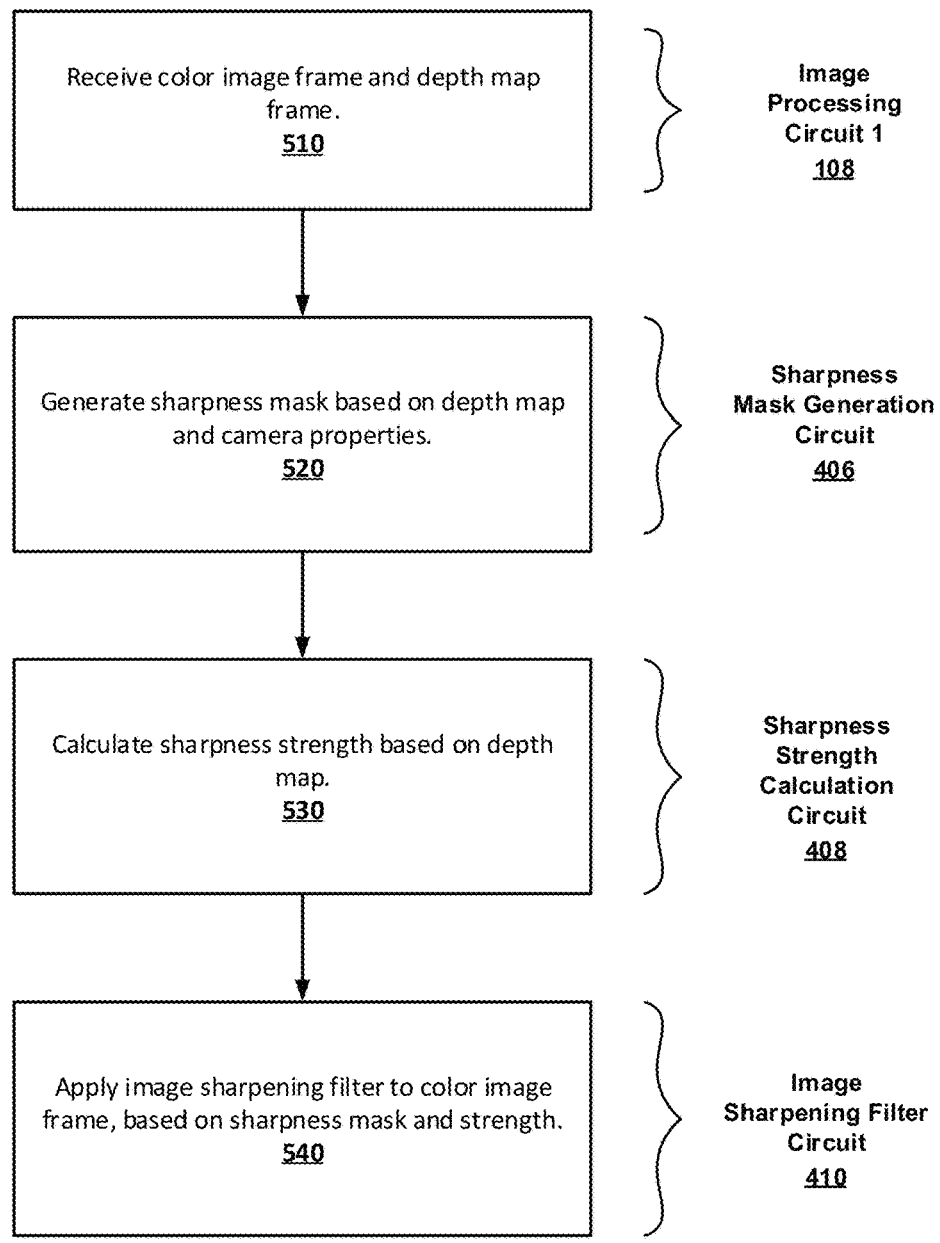
FIG. 5 is a flowchart illustrating, a methodology for depth based edge enhancement of image frames, in accordance with certain embodiments of the present disclosure.

FIG. 5 is a flowchart illustrating an example method 500 for depth based edge enhancement of image frames, in accordance with certain embodiments of the present disclosure. As can be seen, example method 500 includes a number of phases and sub-processes, the sequence of which may vary from one embodiment to another. However, when considered in the aggregate, these phases and sub-processes form a process for depth based edge enhancement in accordance with certain of the embodiments disclosed herein. These embodiments can be implemented, for example using the system architecture illustrated in FIGS. 1 and 4 described above. However other system architectures can be used in other embodiments, as will be apparent in light of this disclosure. To this end, the correlation of the various functions shown in FIGS. 1 and 4 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 500. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 5, in one embodiment, method 500 for depth based edge enhancement commences at operation 510, by receiving a color image frame and a depth map frame from an imaging source, such as, for example, a depth camera. The color image frame comprises an array of color pixels and the depth map frame comprises an array of depth pixels.

Next, at operation 520, a sharpness mask is generated to control the application of image sharpening to each of the color pixels. The sharpness mask is based on the value of depth pixels corresponding to the color pixels, and on properties of the depth camera that generated the color image frame, including depth of field, focal distance, and hyperfocal distance. In some embodiments, the sharpness mask is set to block application of image sharpening to a color pixel if the value of the associated depth pixel is within a selected range about the focal distance, wherein the range is based on the depth of field. In some embodiments, the sharpness mask is set to block application of image sharpening to a color pixel if the value of the depth pixel is greater than half of the hyperfocal distance and the focal distance is greater than or equal to the hyperfocal distance.

At operation 530, sharpness strength is calculated for each of the color pixels. The sharpness strength is proportional to the value of the depth pixel corresponding to the color pixel. At operation 540, a sharpening falter is applied to the color image frame to enhance edge image features. The sharpening filter is applied to regions of the image based on the sharpness mask with a degree of sharpening based on the sharpness strength.

Of course, in some embodiments, additional operations may be performed, as previously described in connection with the system. These additional operations may include, for example, synchronizing the color image frame and the depth map frame to facilitate linking of color pixels with associated depth pixels. Further additional operations may include normalizing the depth map frame so that the values of the depth pixels are in the range of 0 to 255.

Example System

Figure 6:
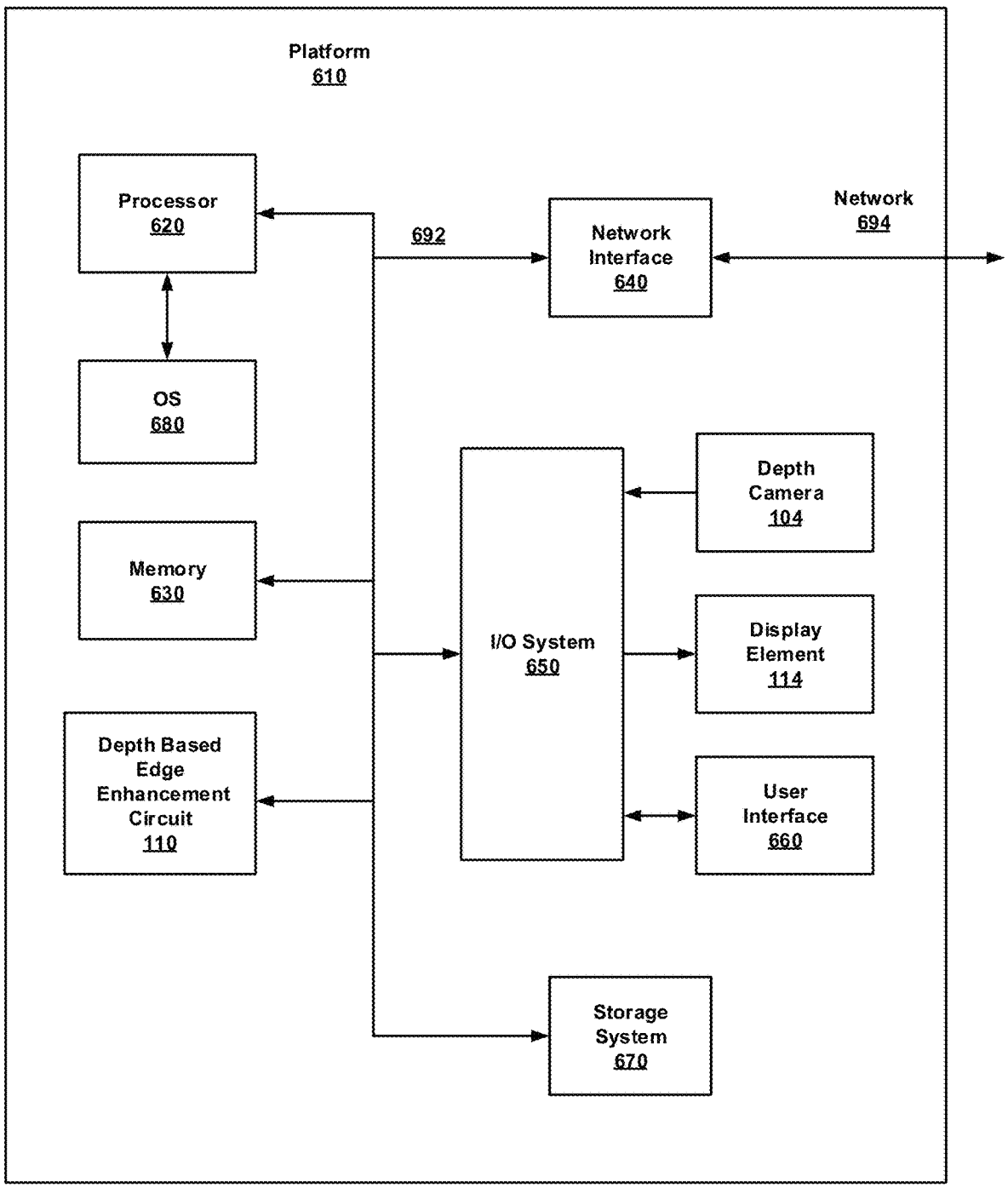
FIG. 6 is a block diagram schematically illustrating, a system platform to perform depth based edge enhancement of image frames, configured in accordance with certain embodiments of the present disclosure.

FIG. 6 illustrates an example system 600 to perform depth based edge enhancement of image frames, configured in accordance with certain embodiments of the present disclosure. In some embodiments, system 600 comprises a platform 610 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device MID), messaging device, data communication device, television (TV), smart TV, TV receiver/converter, and so forth. Any combination of different devices may be used in certain embodiments.

In some embodiments, platform 610 may comprise any combination of a processor 620, a memory 630, depth based edge enhancement circuit 110, a network interface 640, an input/output (I/O) system 650, a depth camera 104, a display element 114, a user interface 660 and a storage system 670. As can be further seen, a bus and/or interconnect 692 is also provided to allow for communication between the various components listed above and/or other components not shown. Platform 610 can be coupled to a network 694 through network interface 640 to allow for communications with other computing devices, platforms or resources. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor or a graphics processing unit, to assist in control and processing operations associated with system 600. In some embodiments, the processor 620 may be implemented as any number of processor cores. The processor (or processor cores) may be any type of processor, such as, for example, a micro-processor, an embedded processor, a digital signal processor (DSP) a graphics processor (GPU), a network processor, a field programmable gate array or other device configured to execute code. The processors may be multithreaded cores in that they may include more than one hardware thread context (or "logical processor") per core. Processor 620 maybe implemented as a complex instruction set computer (CISC) or a reduced instruction set computer (RISC) processor. In some embodiments, processor 620 may be configured as an x86 instruction set compatible processor.

Memory 630 can be implemented using any suitable type of digital storage including, for example, flash memory and/or random access memory (RAM). In some embodiments, the memory 630 may include various layers of memory hierarchy and/or memory caches as are known to those of skill in the art. Memory 630 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included.

Processor 620 may be configured to execute an Operating System (OS) 680 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 600, and therefore may also be implemented using any suitable existing or subsequently-developed platform.

Network interface circuit 640 can be any appropriate network chip or chipset which allows for wired and/or wireless connection between other components of computer system 600 and/or network 694, thereby enabling system 600 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include but are not limited to, wireless local area networks, wireless personal area networks, wireless metropolitan area networks, cellular networks, and satellite networks.

I/O system 650 may be configured to interface between various I/O devices and other components of computer system 600. I/O devices may include, but not be limited to a depth camera 104, a display element 114, and other devices not shown such as a keyboard, mouse, microphone, speaker, etc.

I/O system 650 may include a graphics subsystem configured to perform processing of images for display element 114. Graphics subsystem may be a graphics processing unit or a visual processing unit (VPU), for example. An analog or digital interface may be used to communicatively couple graphics subsystem and display element 114. For example, the interface may be any of a high definition multimedia interface (HDMI), DisplayPort, wireless HDMI, and/or any other suitable interlude using wireless high definition compliait techniques. In some embodiments, the graphics subsystem could be integrated into processor 620 or any chipset of platform 610. In some embodiments, display element 114 may comprise any television type monitor or display. Display element 114 may comprise, for example, a computer display screen, touchscreen display video monitor, television-like device, and/or a television. Display element 114 may be digital and/or analog. Under the control of the OS 680 (or one or more software applications), platform 610 may display edge enhanced images on display element 114. The images may be provided by depth camera 104 and processed in accordance with depth based edge enhancement techniques, as described herein.

It will be appreciated that in some embodiments, the various components of the system 600 may be combined or integrated in a system-on-a-chip (SoC) architecture. In some embodiments, the components may be hardware components, firmware components, software components or any suitable combination of hardware, firmware or software.

Depth based edge enhancement circuit 110 is configured to selectively apply sharpness filtering to regions of an image frame, based on depth information and camera parameters, to enhance the edges in the image. Depth based edge enhancement circuit 110 may include any or all of the components illustrated in FIGS. 1 and 4 as described above.

Depth based edge enhancement circuit 110 can be implemented or otherwise used in conjunction with a variety of suitable software and/or hardware that is coupled to or that otherwise forms a part of platform 610. Depth based edge enhancement circuit 110 can additionally or alternatively be implemented or otherwise used in conjunction with user I/0 devices that are capable of providing information to, and receiving information and commands from, a user. These I/O devices may include display element 114, and other devices collectively referred to as user interface 660. In some embodiments, user interface 660 may include a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, depth based edge enhancement circuit 110 may be installed local to system 600, as shown in the example embodiment of FIG. 6. Alternatively, system 600 can be implemented in a client-server arrangement wherein at least some functionality associated with these circuits is provided to system 600 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 694 or remotely coupled to network 694 by one or more other networks and/or communication channels. In some cases access to resources on a given network or computing system may require credentials such as usernames, passwords, and/or compliance with any other suitable security mechanism.

In various embodiments, system 600 may be implemented as a wireless system, a wired system, or a combination of both. When implemented as a wireless system, system 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces., instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other, The various embodiments disclosed herein can be implemented in various forms of hardware, software, firmware, and/or special purpose processors. For example, in one embodiment at least one non-transitory computer readable storage medium has instructions encoded thereon that, when executed by one or more processors,cause one or more of the depth based edge enhancement methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. Un other embodiments the functionalities disclosed herein can be incorporated into other software applications, such as video editing applications, video analysis applications, video presentation applications, or other content generation, modification, and/or management applications. The computer software applications disclosed herein may include any number of different modules, submodules, or other components of distinct functionality, and can provide information to, or receive information from, still other components. These modules can be used, for example, to communicate with input and/or output devices such as a display screen, a touch sensitive surface, a primer, and/or any other suitable device. Other componentry and functionality not reflected in the illustrations will be apparent in light of this disclosure, and it will be appreciated that other embodiments are not limited to any particular hardware or software configuration. Thus in other embodiments system 600 may comprise additional, fewer, or alternative subcomponents as compared to those included in the example embodiment of FIG. 6.

The aforementioned non-transitory computer readable medium may be any suitable medium for storing digital information, such as a bard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to army particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry:" as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for edge enhancement in image frames. The method comprises: receiving, by a processor, a color image frame comprising a plurality of color pixels and a depth map frame comprising a plurality of depth pixels; generating, by the processor, a sharpness mask to control application of image sharpening to each of the color pixels, the sharpness mask based on a value of the depth pixel corresponding to the color pixel, the sharpness mask further based on a depth of field, a focal distance, and a hyperfocal distance of a camera that generated the color image frame; calculating, by the processor, a sharpness strength for each of the color pixels, the sharpness strength proportional to the value of the depth pixel corresponding to the color pixel; and applying, by the processor, a sharpening filter to the color image frame, the sharpening filter based on the sharpness mask and the sharpness strength, the sharpening filter to enhance edge image features.

Example 2 includes the subject matter of Example 1, further comprising setting the sharpness mask to block application of image sharpening to a color pixel if the value of the depth pixel is within a selected range about the focal distance, the range based on the depth of field.

Example 3 includes the subject matter of Examples 1 or 2, further comprising setting the sharpness mask block application of image sharpening to a color pixel if the value of the depth pixel is greater than half of the hyperfocal distance and the focal distance is greater than or equal to the hyperfocal distance.

Example 4 includes the subject matter of any of Examples 1-3, further comprising setting the sharpness mask to block application of image sharpening to a color pixel if the value of the depth pixel is within a user selectable range.

Example 5 includes the subject matter of any of Examples 1-4, further comprising synchronizing the color image frame and the depth map frame to facilitate linking of color pixels with associated depth pixels.

Example 6 includes the subject matter of any of Examples 1-5, further comprising normalizing the depth map frame so that the values of the depth pixels are in the range of 0 to 255.

Example 7 includes the subject matter of any of Examples 1-6, wherein the color pixel values represent levels of red, green and blue, or levels of luminance and chrominance, Example 8 is a system for edge enhancement in image frames. The system comprises: an image processing circuit to receive a color image frame comprising a plurality of color pixels and a depth map frame comprising a plurality of depth pixels; a sharpness mask generation circuit to generate a sharpness mask to control application of image sharpening to each of the color pixels, the sharpness mask based on a value of the depth pixel corresponding to the color pixel, the sharpness mask further based on a depth of field, a focal distance, and a hyperfocal distance of a camera that generated the color image frame; a sharpness strength calculation circuit to calculate a sharpness strength for each of the color pixels, the sharpness strength proportional to the value of the depth pixel corresponding to the color pixel and an image sharpening filter circuit to apply a sharpening filter to the color image frame, the sharpening filter based on the sharpness mask and the sharpness strength, the sharpening filter to enhance edge image features.

Example 9 includes the subject matter of Example 8, wherein the sharpness mask generation circuit is further to set the sharpness mask to block application of image sharpening to a color pixel if the value of the depth pixel is within a selected range about the focal distance, the range based on the depth of field.

Example 10 includes the subject matter of Examples 8 or 9, wherein the sharpness mask generation circuit is further to set the sharpness mask to block application of image sharpening to a color pixel if the value of the depth pixel is greater than half of the hyperfocal distance and the focal distance is greater than or equal to the hyperfocal distance.

Example 11 includes the subject matter of any of Examples 8-10, wherein the sharpness mask generation circuit is further to set the sharpness mask to block application of image sharpening to a color pixel if the value of the depth pixel is within a user selectable range.

Example 12 includes the subject matter of any of Examples 8-11, further comprising a frame synchronization circuit to synchronize the color image frame and the depth map frame to facilitate linking of color pixels with associated depth pixels.

Example 13 includes the subject matter of any of Examples 8-12, further comprising a normalization circuit to normalize the depth map frame so that the values of the depth pixels are in the range of 0 to 255.

Example 14 includes the subject matter of any of Examples 8-13, wherein the color pixel values represent levels of red, green and blue, or levels of luminance and chrominance.

Example 15 includes the subject matter of any of Examples 8-14, wherein the system is a mobile computing device.

Example 16 is at least one non-transitory computer readable storage medium having instructions encoded thereon that, when executed by one or more processors, result in the following operations for edge enhancement in image frames. The operations comprise: receiving a color image frame comprising a plurality of color pixels and a depth map frame comprising a plurality of depth pixels; generating a sharpness mask to control application of image sharpening to each of the color pixels, the sharpness mask based on a value of the depth pixel corresponding to the color pixel, the sharpness mask further based on a depth of field, a focal distance, and a hyperfocal distance of a camera that generated the color image frame; calculating a sharpness strength for each of the color pixels, the sharpness strength proportional to the value of the depth pixel corresponding to the color pixel; and applying a sharpening filter to the color image frame, the sharpening filter based on the sharpness mask and the sharpness strength, the sharpening filter to enhance edge image features.

Example 17 includes the subject matter of Example 16, the operations further comprising setting the sharpness mask to block application of image sharpening to a color pixel if the value of the depth pixel is within a selected range about the focal distance, the range based on the depth of field.

Example 18 includes the subject matter of Examples 16 or 17, the operations farther comprising setting the sharpness mask to block application of image sharpening to a color pixel if the value of the depth pixel is greater than half of the hyperfocal distance and the focal distance is greater than or equal to the hyperfocal distance.

Example 19 includes the subject matter of any of Examples 16-18, the operations farther comprising setting the sharpness mask to block application of image sharpening to a color pixel if the value of the depth pixel is within a user selectable range, Example 20 includes the subject matter of any of Examples 16-19, the operations further comprising synchronizing the color image frame and the depth map flame to facilitate linking of color pixels with associated depth pixels.

Example 21 includes the subject matter of any of Examples 16-20, the operations further comprising normalizing the depth map frame so that the values of the depth pixels are in the range of 0 to 255.

Example 22 includes the subject matter or any of Examples 10-21, wherein the color pixel values represent either levels of red, green and blue, or levels of luminance and chrominance.

Example 23 is a mobile computimg device comprising the computer readable storage medium of claim 16.

Example 24 is a system for edge enhancement in image frames. The system comprises: means for receiving a color image frame comprising a plurality of color pixels and a depth map frame comprising a plurality of depth pixels; means for generating a sharpness mask to control application of image sharpening to each of the color pixels, the sharpness mask based on a value of the depth pixel corresponding to the color pixel, the sharpness mask further based on a depth of field, a focal distance, and a hyperfocal distance of a camera that generated the color image frame; means for calculating a sharpness strength for each of the color pixels, the sharpness strength proportional to the value of the depth pixel corresponding to the color pixel; and means for applying a sharpening filter to the color image frame, the sharpening filter based on the sharpness mask and the sharpness strength, the sharpening filter to enhance edge image features.

Example 25 includes the subject matter of Example 24, further comprising means for setting the sharpness mask to block application of image sharpening to a color pixel if the value of the depth pixel is within a selected range about the focal distance, the range based on the depth of field.

Example 26 includes the subject matter of Examples 24 or 25, further comprising means for setting the sharpness mask to block application of image sharpening to a color pixel if the value of the depth pixel is greater than half of the hyperfocal distance and the focal distance is greater than or equal to the hyperfocal distance.

Example 27 includes the subject matter of any of Examples 24-26, further comprising means for setting the sharpness mask to block application of image sharpening to a color pixel if the value of the depth pixel is within a user selectable range.

Example 28 includes the subject matter of any of Examples 24-27, further comprising means for synchronizing the color image frame and the depth map frame to facilitate linking of color pixels with associated depth pixels.

Example 29 includes the subject matter of any of Examples 24-28, further comprising means for normalizing the depth map frame so that the values of the depth pixels are in the range of 0 to 255.

Example 30 includes the subject matter of any of Examples 24-29, wherein the color pixel values represent levels of red, green and blue, or levels of luminance and chrominance.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for edge enhancement in image frames, the method comprising:
   receiving, by a processor, a color image frame comprising a plurality of color pixels and a depth map frame comprising a plurality of depth pixels;
   generating, by the processor, a sharpness mask to control application of image sharpening to each of the plurality of color pixels, the sharpness mask comprising a plurality of elements, each of the plurality of elements associated with one of the plurality of color pixels and one of the plurality of depth pixels and based on a value of the associated depth pixel, the sharpness mask further based on a depth of field, a focal distance, and a hyperfocal distance of a camera that generated the color image frame;

calculating, by the processor, a sharpness strength for each of the plurality of color pixels, the sharpness strength proportional to the value of the depth pixel associated with the color pixel; and applying, by the processor, a sharpening filter to the color image frame, the sharpening filter based on the sharpness mask and the sharpness strength, the sharpening filter to enhance edge image features.

2. The method of claim 1, further comprising setting the sharpness mask to block application of image sharpening to one of the plurality of color pixels if the value of the associated depth pixel is within a selected range about the focal distance, the range based on the depth of field.

3. The method of claim 1, further comprising setting the sharpness mask to block application of image sharpening to one of the plurality of color pixels if the value of the associated depth pixel is greater than half of the hyperfocal distance and the focal distance is greater than or equal to the hyperfocal distance.

4. The method of claim 1, further comprising setting the sharpness mask to block application of image sharpening to one of the plurality of color pixels if the value of the depth pixel is within a user selectable range.

5. The method of claim 1, further comprising:
synchronizing the color image frame and the depth map frame to facilitate linking of the plurality of color pixels with associated depth pixels; and
normalizing the depth map frame so that the values of the plurality of depth pixels are in the range of 0 to 255.

6. The method of claim 1, wherein the plurality of color pixel values represents levels of red, green and blue, or levels of luminance and chrominance.

7. A system for edge enhancement in image frames, the system comprising:
an image processing circuit to receive a color image frame comprising a plurality of color pixels and a depth map frame comprising a plurality of depth pixels;
a sharpness mask generation circuit to generate a sharpness mask to control application of image sharpening to each of the plurality of color pixels, the sharpness mask comprising a plurality of elements, each of the plurality of elements associated with one of the plurality of color pixels and one of the plurality of depth pixels and based on a value of the associated depth pixel the sharpness mask further based on a depth of field, a focal distance, and a hyperfocal distance of a camera that generated the color image frame;
a sharpness strength calculation circuit to calculate a sharpness strength for each of the plurality of color pixels, the sharpness strength proportional to the value of the depth pixel associated with the color pixel; and
an image sharpening filter circuit to apply a sharpening filter to the color image frame, the sharpening filter based on the sharpness mask and the sharpness strength, the sharpening filter to enhance edge image features.

8. The system of claim 7, wherein the sharpness mask generation circuit is further configured to set the sharpness mask to block application of image sharpening to one of the plurality of color pixels if the value of the associated depth pixel is within a selected range about the focal distance, the range based on the depth of field.

9. The system of claim 7, wherein the sharpness mask generation circuit is further configured to set the sharpness mask to block application of image sharpening to one of the plurality of color pixels if the value of the associated depth pixel is greater than half of the hyperfocal distance and the focal distance is greater than or equal to the hyperfocal distance.

10. The system of claim 7, wherein the sharpness mask generation circuit is further configured to set the sharpness mask to block application of image sharpening to one of the plurality of color pixels if the value of the depth pixel is within a user selectable range.

11. The system of claim 7, further comprising:
a frame synchronization circuit to synchronize the color image frame and the depth map frame to facilitate linking of the plurality of color pixels with associated depth pixels; and
a normalization circuit to normalize the depth map frame so that the values of the plurality of depth pixels are in the range of 0 to 255.

12. The system of claim 7, wherein the plurality of color pixel values represents levels of red, green and blue, or levels of luminance and chrominance.

13. The system of claim 7, wherein the system is a mobile computing device.

14. A computer program product including one or more non-transitory machine-readable mediums encoded with instructions that when executed by one or more processors cause a process to be carried out for edge enhancement in image frames, the process comprising:
receiving a color image frame comprising a plurality of color pixels and a depth map frame comprising a plurality of depth pixels;
generating a sharpness mask to control application of image sharpening to each of the plurality of color pixels, the sharpness mask comprising a plurality of elements, each of the plurality of elements associated with one of the plurality of color pixels and one of the plurality of depth pixels and based on a value of the associated depth pixel, the sharpness mask further based on a depth of field, a focal distance, and a hyperfocal distance of a camera that generated the color image frame;
calculating a sharpness strength for each of the plurality of color pixels, the sharpness strength proportional to the value of the depth pixel associated with the color pixel; and
applying a sharpening filter to the color image frame, the sharpening filter based on the sharpness mask and the sharpness strength, the sharpening filter to enhance edge image features.

15. The computer program product of claim 14, the process further comprising setting the sharpness mask to block application of image sharpening to one of the plurality of color pixels if the value of the associated depth pixel is within a selected range about the focal distance, the range based on the depth of field.

16. The computer program product of claim 14, the process further comprising setting the sharpness mask to block application of image sharpening to one of the plurality of color pixels if the value of the associated depth pixel is greater than half of the hyperfocal distance and the focal distance is greater than or equal to the hyperfocal distance.

17. The computer program product of claim 14, the process further comprising setting the sharpness mask to block application of image sharpening to one of the plurality of color pixels if the value of the depth pixel is within a user selectable range.

18. The computer program product of claim 14, the process further comprising synchronizing the color image frame and the depth map frame to facilitate linking of the plurality of color pixels with associated depth pixels.

19. The computer program product of claim 14, the process further comprising normalizing the depth map frame so that the values of the plurality of depth pixels are in the range of 0 to 255.

20. The computer program product of claim 14, wherein the plurality of color pixel values represents either levels of red, green and blue, or levels of luminance and chrominance.

* * * * *